United States Patent

Sutherland et al.

[11] Patent Number: 5,902,024
[45] Date of Patent: May 11, 1999

[54] STORAGE SYSTEM

[75] Inventors: Richard Sutherland, Welford-on-Avon; George Kerr, Accrington, both of United Kingdom

[73] Assignee: McKechnie UK Limited, United Kingdom

[21] Appl. No.: 08/881,584

[22] Filed: Jun. 24, 1997

[30] Foreign Application Priority Data

Dec. 4, 1996 [GB] United Kingdom .................... 9625155

[51] Int. Cl.⁶ .................................................. A47B 81/06
[52] U.S. Cl. ....................... 312/9.57; 312/9.48; 312/9.63
[58] Field of Search ................................. 312/9.53, 9.47, 312/9.48, 242, 9.54, 9.57, 9.63, 319.1, 351; 206/308.1; 11/387.15

[56] References Cited

U.S. PATENT DOCUMENTS

| | | | |
|---|---|---|---|
| 3,620,404 | 11/1971 | Grasso | 312/242 X |
| 4,678,245 | 7/1987 | Fouassier | 206/308.1 X |
| 4,712,843 | 12/1987 | Castelli et al. | 312/242 X |
| 4,744,463 | 5/1988 | Merzon . | |
| 4,771,887 | 9/1988 | Nehl | 312/9.57 X |
| 4,815,598 | 3/1989 | Richter | 312/9.63 X |
| 4,815,795 | 3/1989 | Accumanno et al. | 312/242 X |
| 4,819,801 | 4/1989 | Howard . | |
| 4,819,802 | 4/1989 | Gutierrez | 312/9.57 X |
| 4,850,477 | 7/1989 | Gelardi et al. . | |
| 4,889,244 | 12/1989 | Hehn et al. . | |
| 5,297,675 | 3/1994 | Martucci . | |
| 5,393,135 | 2/1995 | Tisbo et al. | 312/9.57 X |
| 5,409,108 | 4/1995 | Clausen et al. | 312/9.63 X |
| 5,645,329 | 7/1997 | Madock | 312/9.63 |

FOREIGN PATENT DOCUMENTS 2 190 829  12/1987  United Kingdom .
2 246 509   2/1992  United Kingdom .

Primary Examiner—Peter M. Cuomo
Assistant Examiner—Hanh V. Tran
Attorney, Agent, or Firm—Kirschstein, et al.

[57] ABSTRACT

A storage system is described, for receipt in an aperture in an item of furniture. The storage system comprises at least four sides, and pegs protruding outwardly from at least two opposite sides and interengageable with respective openings in the aperture by inwardly flexing the peg bearing sides. It further comprises at least two spaced rails bearing receiving formations, the receiving formations of the at least two rails being aligned such that plurality of items may be stored generally parallel to each other between them.

2 Claims, 2 Drawing Sheets

5,902,024

STORAGE SYSTEM

BACKGROUND OF THE INVENTION

This invention relates to a storage system, and in particular although not exclusively to a storage system for compact discs (CDs) or video cassettes.

It is an object of the invention to provide an improved storage system.

SUMMARY OF THE INVENTION

According to a first aspect of the invention there is provided a storage system for receipt in an aperture in an item of furniture comprising:

(a) at least four sides:

(b) pegs protruding outwardly from at least two opposite sides and inter-engagable with respective openings extending outwardly from the aperture by inwardly flexing the peg bearing sides, and (c) at least two spaced rails bearing receiving formations, the receiving formations of the rails being aligned such that a plurality of items may be stored generally parallel to each other between the sides.

The invention provides the advantage that a storage system of desired kind may be inserted into an item of furniture, retained there and removed, all without the use of tools.

Preferably, the at least four sides form a rectangle and the pegs protrude outwardly from the two longer sides.

Preferably, each peg bearing side bears at least two pegs spaced apart along the length of the side. The at least two pegs may be provided towards each end of the side.

Preferably each receiving formation comprises a slot for receipt of an item and a resilient element to assist in retention of the item within the slot.

The resilient element may comprise a tongue protruding into the slot which when an item is inserted into the slot is displaced into a recess and bears onto the item.

The slot may comprise a relatively wider portion towards its open end and a relatively narrow portion at its closed end, adjacent the rail, adapted for receipt of relatively wider and relatively narrower items respectively. The slot may further comprise a mouth portion at its open end which guides an item into the relatively wider portion when being inserted.

BRIEF DESCRIPTION OF THE DRAWINGS

One example of a storage system according to the invention will now be described, by way of example only, with reference to the accompanying drawings in which.

DESCRIPTION OF THE PREFERRED EMBODIMENTS

Figure 1:
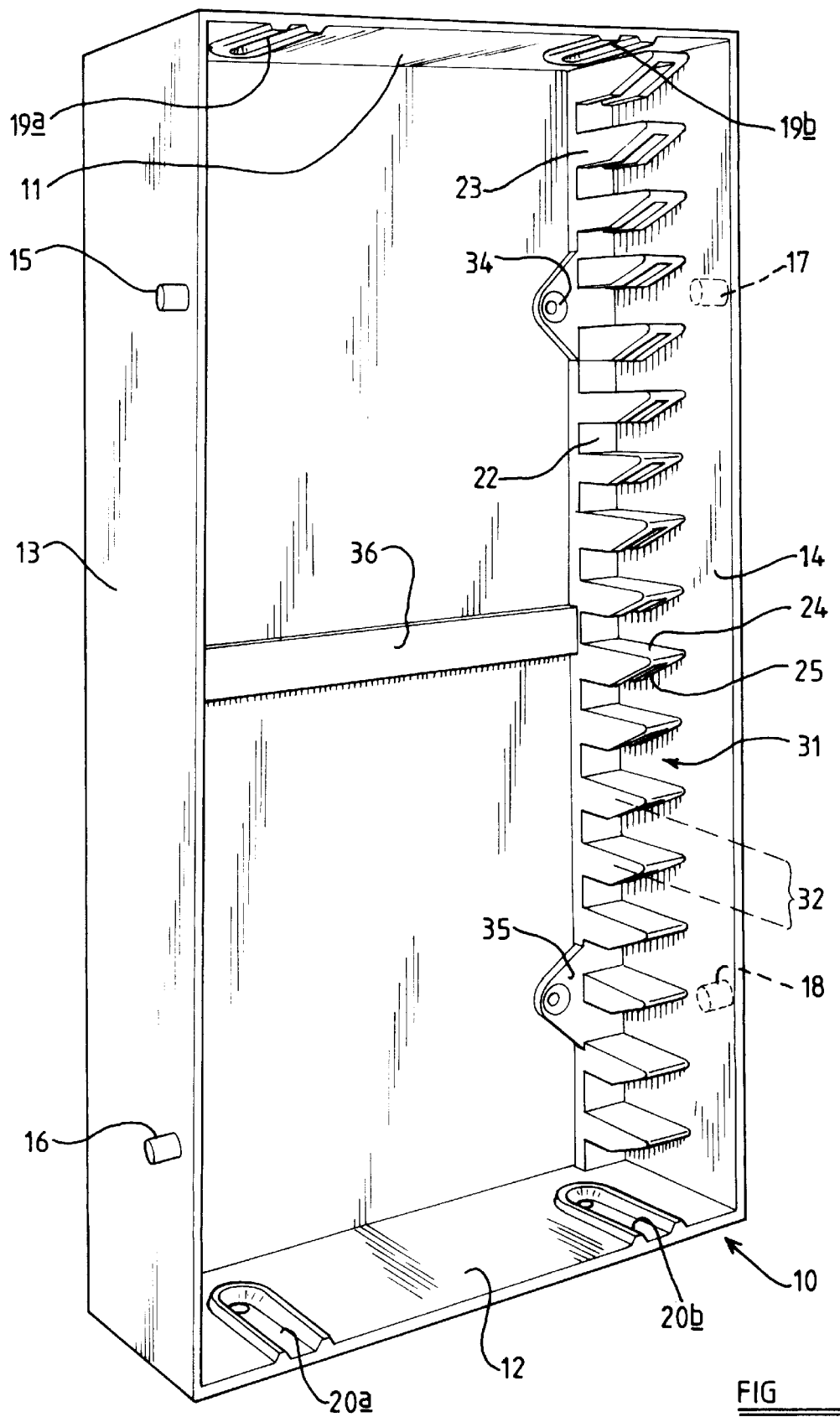
FIG. 1 is a perspective front view of a storage system according to the invention, designed for storage of CDs.

A storage system 10 is of generally rectangular shape, having shorter top and bottom sides 11, 12 and longer left and right sides 13, 14. The left side 13 bears outwardly extending pegs 15, 16 and the right side 14, bears outwardly extending pegs 17, 18. The pegs 15–18 are provided on their respective sides towards but preferably not adjacent to, either end.

The storage system 10 is adapted for receipt in an aperture in an item of furniture (not shown). The aperture into which the storage system 10 is to be received comprises outwardly extending openings adapted and arranged for receipt of the pegs 15–18. The storage system 10 is inserted into the aperture by inward flexing of the left and right peg-bearing sides 13,14 such that the pegs 15–18 clear the edges of the aperture and when the sides 13, 14 are released the pegs 15–18 inter-engage in the respective openings. Thus, once received in the aperture the storage system 10 is retained there by the inter-engagement of the pegs 15–18 in the respective openings.

Figure 2:
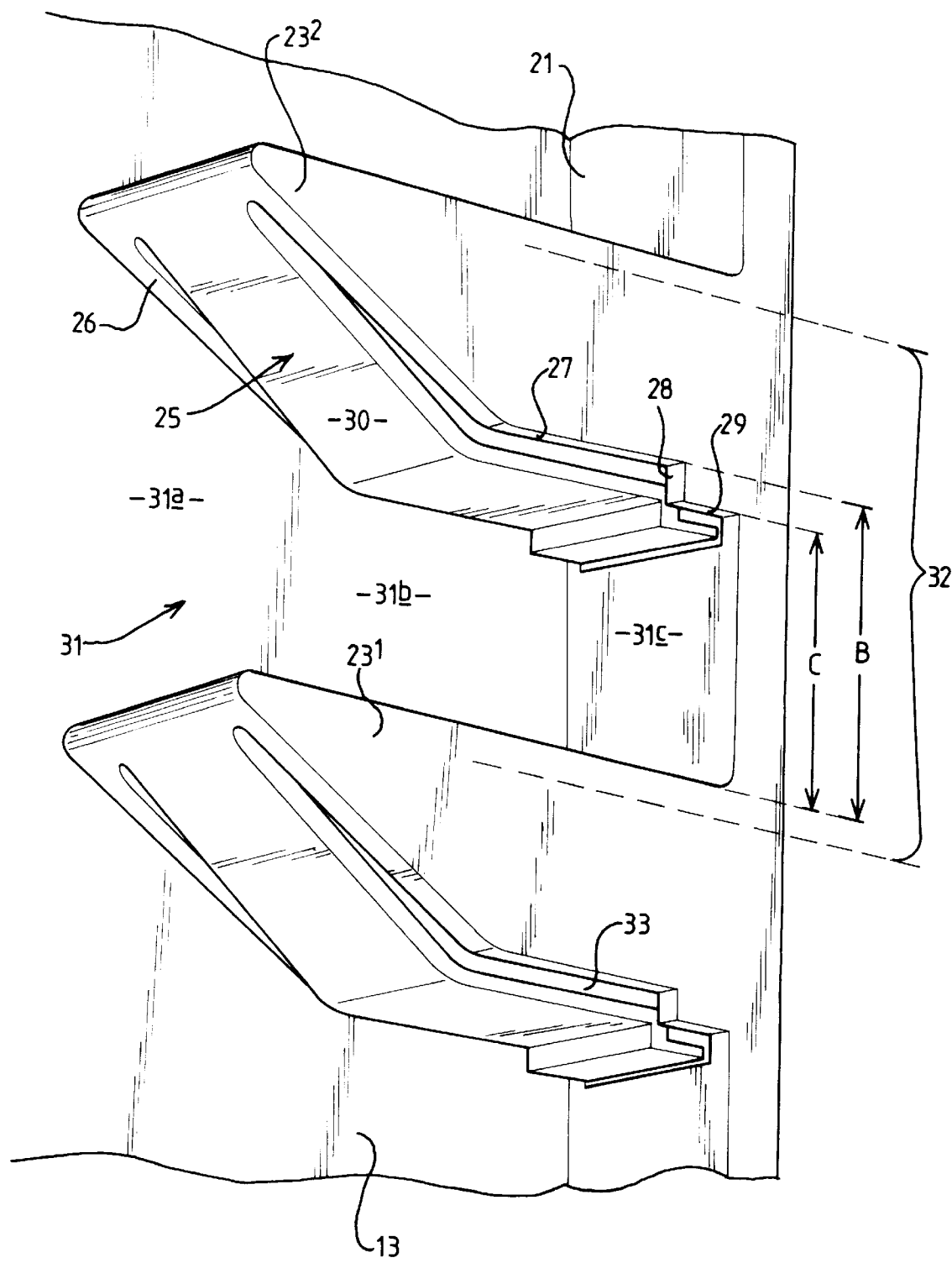
FIG. 2 shows a portion of the storage system of FIG. 1 in greater detail.

The storage system 10 further comprises at least two spaced rails 21, 22 each bearing a plurality of aligned protruding formations 23 as will be described below. As can be seen from FIG. 1 rail 22 runs parallel to and adjacent to the right side 14. Likewise, rail 21 runs parallel to and adjacent to the left side 13, and a portion is shown in detail in FIG. 2.

Each protruding formation 23 comprises a substantially flat upper surface 24. Each protruding formation 23 further comprises a complex lower surface 25, which comprises adjacent its free end a downwardly and inwardly directed portion 26, a first substantially horizontal portion 27, a downward step portion 28, and a second substantially horizontal portion 29. The majority of the complex lower surface 25, through all four portions 26–29 forms a resilient tongue 30, which is attached adjacent the free end of the protruding formation 23.

The upper surface 24 of a first protruding formation $23^1$ forms, in combination with the lower surface 25 of a second protruding formation $23^2$ above the first, a receiving formation 32 for an item to be stored. The receiving formation 32 provides a slot 31 having three portions 31a, 32b and 31c. A mouth portion 31a is provided at its open end, between the downwardly and inwardly directed portion 26, of the upper protruding formation $23^2$, and the upper surface 24 of the lower protruding formation $23^1$. A relatively wider portion 31b is provided beneath the first substantially horizontal portion 27 of the upper protruding formation $23^2$. A relatively narrower portion 31c is provided beneath the second substantially horizontal portion 29 of the upper protruding formation $23^2$. The resilient tongue 30 protrudes downwards into the slot 31 in all three portions 31a–c. A recess 33 is provided in the formation 23, such that if the tongue 30 is displaced upwardly it is received in the recess 33.

When an item is inserted into two aligned receiving formations 32 providing slots 31, it first enters the mouth portions 31a which assist in guidance of the item into the slots 31. The item then passes into the relatively wider portions 31b of height B. If the item being inserted is of thickness B then the tongues 30 are displaced up into the recesses 33 provided within the protruding formations 23, and bear down on the item. The item will abut against the downward step portions 28 of the lower surfaces 25, and will not be able to enter the relatively narrower portions 31c of the slots 31. The item will therefore be retained, assisted by pressure exerted by the tongues 30, within the relatively wider portions 31b of the slots 31.

However, if the item being inserted is narrower than B, it can be pushed further into the slots 31 and enter the relatively narrower portions 31c of height C. If the item being inserted is of substantially thickness C, it will displace the end portions of the resilient tongues 30 upwards into the recesses 33 and will be retained in the relatively narrower portions 31*c* of the slots 31. Hence, the receiving formations 32, provided by adjacent protruding formations 23, are adapted for receipt and retention of two different thicknesses (B,C) of items. In particular, where the storage system 10 is adapted for storage of CDs, the two sizes of item may be album CDs and single CDs each in respective cases, of thicknesses B and C respectively.

The storage system 10 is further provided with screw fixing formations 19*a*, 19*b* on the top side 11 and screw fixing formations 20*a*, 20*b* on the bottom side 12. These may be used for more permanent fixing of the storage system 10 within the aperture in an item of furniture or for fixing of the storage 10 in an alternative environment.

Lugs 34 and 35 are provided on the rail 22, with similar lugs (not shown) being provided on the rail 21. The lugs 34, 35 provide a further alternative fixing method for the storage system 10 again for more permanent fixing in the aperture or for fixing in an alternative environment.

A cross brace 36 is provided between the rails 21, 22 to increase the rigidity of the storage system 10.

Additional pegs may be provided, on the left and right sides 13,14, or indeed on the top and bottom sides 11,12. Any sides which are peg-bearing must be sufficiently flexible to be capable of being inwardly flexed for insertion of the storage system 10 in the aperture. Those sides which are not peg-bearing may be rigid.

The receiving formations provided may take alternative forms adapted for receipt of items of a single thickness, two thicknesses or more than two. Embodiments of the invention may for example be designed for storage of video cassettes. Additional rails, bearing receiving formations, may be provided.

The embodiment described above may be installed in furniture in either a horizontal or vertical orientation. The orientation of FIG. 1 may be taken to be vertical, in that the longer sides 13,14, are vertical as are the rails 21,22. The storage system 10 may, however, be used in the horizontal orientation in which the longer sides 13,14 and rails 21,22, are horizontal.

We claim:

1. A storage system, comprising: at least four sides forming a generally rectangular shape, at least two parallel spaced apart rails generally parallel to two of the at least four sides and located within the generally rectangular shape, each rail bearing a plurality of receiving formations, the receiving formations of the at least two rails being aligned for storing a plurality of items generally parallel to each other between them, each item when stored having a first portion received in one of the receiving formations on a first of the rails and a second portion received in an aligned other of the receiving formations on a second of the rails, each of the receiving formations comprising an upper surface and a lower surface defining, in combination with the respective rail, a slot for receipt of a portion of an item to be stored, and a resilient element comprising a tongue protruding into the slot and which, when the portion of the item is inserted into the slot, is displaced into a recess and bears onto the item, the upper surface of each of the receiving formations having a free end distant from the respective rail and being complex and comprising, at the free end, a downwardly and inwardly directed portion connected to a first substantially horizontal portion connected to a downward step portion connected to a second substantially horizontal portion connected to the respective rail, and substantially all of the upper surface comprising the tongue, and the lower surface of each of the receiving formations having a free end distant from the respective rail and being substantially flat and horizontal, each slot comprising a mouth portion at the free end which guides an item into a first relatively wide parallel portion which leads to a second relatively narrow portion adjacent the respective rail, the relatively wide and narrow portions being adapted for receipt of relatively wider and narrower items respectively.

2. The storage system according to claim 1, wherein the tongue protrudes downwardly into each of the mouth portion, the relatively wide portion and the relatively narrow portion of the slot.

\* \* \* \* \*